(12) United States Patent
Vizzini et al.

(10) Patent No.: US 12,469,903 B2
(45) Date of Patent: Nov. 11, 2025

(54) BATTERY CELL PACK FOR ELECTRIC VEHICLE

(71) Applicant: Volvo Car Corporation, Gothenburg (SE)

(72) Inventors: Simone Vizzini, Gothenburg (SE); Klas Persson, Kungälv (SE)

(73) Assignee: Volvo Car Corporation, Gothenburg (SE)

( * ) Notice: Subject to any disclaimer, the term of this patent is extended or adjusted under 35 U.S.C. 154(b) by 359 days.

(21) Appl. No.: 17/965,077

(22) Filed: Oct. 13, 2022

(65) Prior Publication Data
US 2023/0124905 A1    Apr. 20, 2023

(30) Foreign Application Priority Data

Oct. 15, 2021  (EP) .................................. 21202986

(51) Int. Cl.
*B60L 50/64*    (2019.01)
*B60K 1/04*    (2019.01)
(Continued)

(52) U.S. Cl.
CPC ............. *H01M 10/658* (2015.04); *B60K 1/04* (2013.01); *B60L 50/64* (2019.02);
(Continued)

(58) Field of Classification Search
CPC ............. H01M 10/658; H01M 10/613; H01M 10/625; H01M 10/647; H01M 10/6554;
(Continued)

(56) References Cited

U.S. PATENT DOCUMENTS 10,476,061 B1 * 11/2019 Groebl .................... B60L 50/66
11,664,546 B2 *  5/2023 Stude ...................... B32B 15/14
                                                            429/120
(Continued)

FOREIGN PATENT DOCUMENTS

JP    2015133169 A  *  7/2015   .......... H01M 10/613
WO   20130161655 A1    10/2013
(Continued)

OTHER PUBLICATIONS

Translation of WO2020188949 A1 accessed on Nov. 30, 2024 at www.espacenet.com (Year: 2020).*
(Continued)

*Primary Examiner* — James A Shriver, II
*Assistant Examiner* — Hilary L Johns
(74) *Attorney, Agent, or Firm* — Clements Bernard Walker; Christopher L. Bernard

(57) ABSTRACT

A battery cell pack includes a battery cell having first and second terminals and a gas vent on a bottom side of the battery cell; a frame on the bottom side of the battery cell, the frame including: a frame plate including first and second openings aligned with the first and second terminals and a third opening aligned with the gas vent, and first and second intermediate frame walls extending perpendicular to the frame plate; and a thermal protection plate extending between the intermediate frame walls, wherein the intermediate frame walls and the thermal protection plate form a channel along a length of the bottom side of the battery cell between the terminals. The present disclosure further relates to a battery pack including a plurality of battery cell packs and an electric vehicle including a battery pack.

20 Claims, 4 Drawing Sheets

(51) Int. Cl.
*H01M 10/613* (2014.01)
*H01M 10/625* (2014.01)
*H01M 10/647* (2014.01)
*H01M 10/653* (2014.01)
*H01M 10/6554* (2014.01)
*H01M 10/658* (2014.01)
*H01M 50/209* (2021.01)
*H01M 50/224* (2021.01)
*H01M 50/227* (2021.01)
*H01M 50/244* (2021.01)
*H01M 50/249* (2021.01)
*H01M 50/317* (2021.01)
*H01M 50/342* (2021.01)
*H01M 50/375* (2021.01)
*B60K 1/00* (2006.01)

(52) U.S. Cl.
CPC ....... *H01M 10/613* (2015.04); *H01M 10/625* (2015.04); *H01M 10/647* (2015.04); *H01M 10/653* (2015.04); *H01M 10/6554* (2015.04); *H01M 50/209* (2021.01); *H01M 50/224* (2021.01); *H01M 50/227* (2021.01); *H01M 50/244* (2021.01); *H01M 50/249* (2021.01); *H01M 50/317* (2021.01); *H01M 50/3425* (2021.01); *H01M 50/375* (2021.01); *B60K 2001/005* (2013.01); *B60K 2001/0438* (2013.01); *H01M 2220/20* (2013.01)

(58) Field of Classification Search
CPC ............. H01M 50/249; H01M 50/227; H01M 50/209; H01M 50/244; H01M 50/224; H01M 50/317; H01M 50/375; H01M 2220/20; B60K 1/04; B60K 2001/005; B60K 2001/0438
USPC ........................................................ 180/68.5
See application file for complete search history.

(56) References Cited

U.S. PATENT DOCUMENTS

| | | | |
|---|---|---|---|
| 12,068,499 B2* | 8/2024 | Yoshida | H01M 50/209 |
| 12,095,066 B2* | 9/2024 | Stude | H01M 10/658 |
| 2014/0335385 A1* | 11/2014 | Ikeya | H01M 50/358 |
| | | | 429/121 |
| 2019/0296286 A1* | 9/2019 | Stichling | H01M 50/105 |
| 2021/0074960 A1* | 3/2021 | Stude | B32B 15/20 |
| 2022/0149477 A1* | 5/2022 | Yoshida | H01M 50/249 |

FOREIGN PATENT DOCUMENTS

| | | |
|---|---|---|
| WO | 20200188949 A1 | 9/2020 |
| WO | WO-2020188949 A1 * | 9/2020 .......... H01M 10/613 |

OTHER PUBLICATIONS

Translation of JP2015133169A accessed on Nov. 30, 2024 at www.espacenet.com (Year: 2015).*

Mar. 21, 2022 European Search Report issued in corresponding International Application No. 21202986.

* cited by examiner

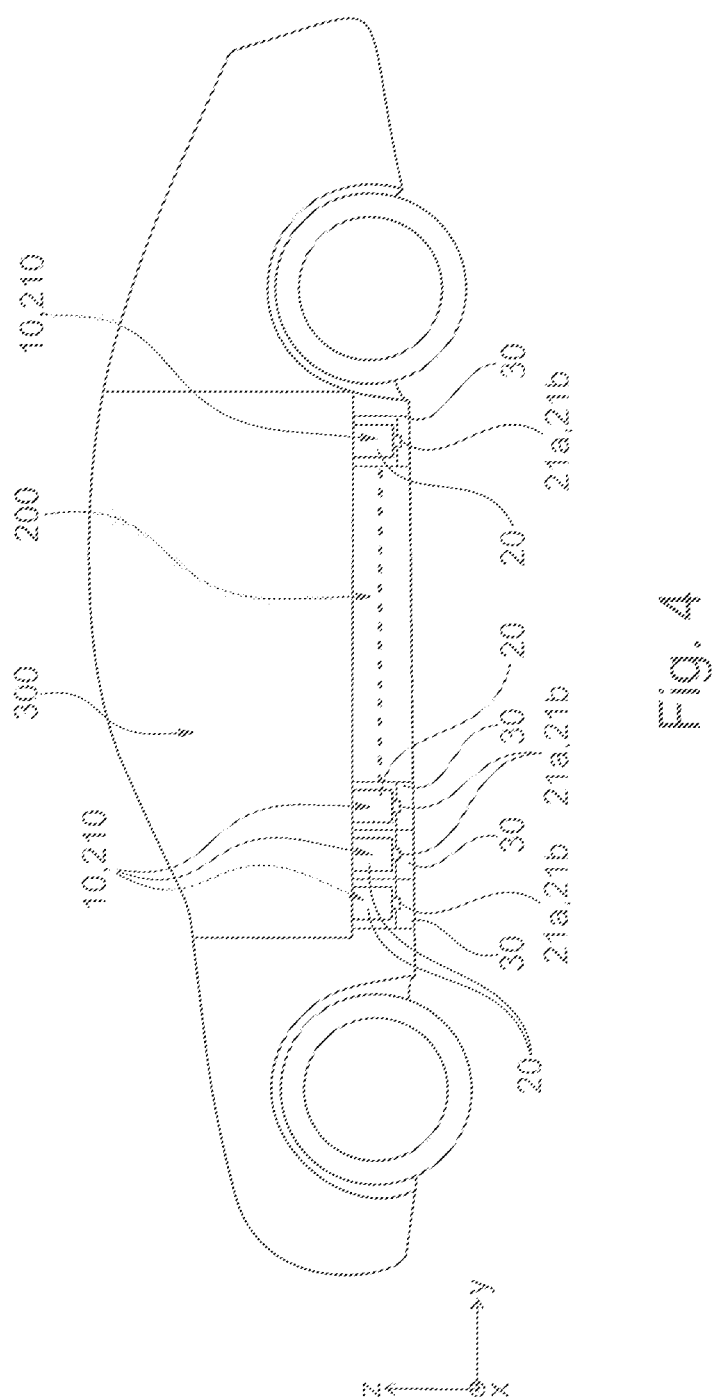

BATTERY CELL PACK FOR ELECTRIC VEHICLE

CROSS-REFERENCE TO RELATED APPLICATION

The present disclosure claims the benefit of priority of co-pending European Patent Application No. 21202986.2, filed on Oct. 15, 2021, and entitled "BATTERY CELL PACK FOR ELECTRIC VEHICLE," the contents of which are incorporated in full by reference herein.

TECHNICAL FIELD

The present disclosure relates to a battery cell pack for an electric vehicle, a battery pack including a plurality of battery cell packs, and an electric vehicle including a battery pack.

BACKGROUND

Electrical vehicles (EV) such as battery electric vehicles (BEV) use a high voltage battery to act as an energy source for the vehicle. To provide enough range with current cell technology, a battery is located underneath the cabin. The battery typically includes a plurality of cells connected in serial or in parallel. Each cell has two terminals and a cell vent on a top side of the cell facing the cabin of the electric vehicle. The cell venting allows flammable gas, produced by an electrolyte in the cell, to be released during battery life.

In order to handle a safety thermal event, like thermal runaway, a thermal protection material plate is typically placed between a top cover and the top side of the battery including the terminals and the cell vent, protecting the passenger cabin of the vehicle from high temperatures.

Moreover, in order to reduce the temperature of the cells, a cooling plate is typically placed below a bottom side of the cells, opposite to the top side. Moreover, in order to reduce thermal losses from the cell and cooling system to the ambient, a thermal insulation material is placed below the cooling system.

SUMMARY

According to an aspect of the present disclosure, the present application provides a battery cell pack including a battery cell having first and second terminals and a gas vent on a bottom side of the battery cell; a frame on the bottom side of the battery cell, the frame including: a frame plate including first and second openings aligned with the first and second terminals and a third opening aligned with the gas vent, and first and second intermediate frame walls extending perpendicular to the frame plate; and a thermal protection plate extending between the intermediate frame walls, wherein the intermediate frame walls and the thermal protection plate form a channel along a length of the bottom side of the battery cell between the terminals. The intermediate frame walls may extend along a thickness direction of the battery cell. Consequently, also the channel may extend along a thickness direction of the battery cell. As mentioned in the background, typical configurations require of a thermal protection plate between the battery cell and the vehicle's cabin floor in order to protect passengers when thermal runaway occurs. The present configuration provides a protection barrier for the vehicle cabin due to the placement of the cooling plate on the top side of the cell. The specific configuration and placement provide this protection without increasing the battery height, thereby providing a more compact battery structure for an engine.

In the context of the present disclosure, a bottom side of the battery cell is a side of the battery cell which faces downwards if the battery cell is in an operational position. In the operational position, the battery cell may be used in a battery cell pack, e.g. a battery cell pack according to the present disclosure.

In an example of the present disclosure, the two intermediate frame walls are placed between each opening of the terminals and the cell vent, respectively. This means that each of the two intermediate frame walls is placed between one of the first and second openings for the terminals and the third opening for the gas vent. Such allocation of the intermediate frame walls between the first and second openings and the third opening, respectively, allow for avoiding short circuit between cell terminals due to conductive vented gases through the cell vent. In other words, the intermediate frame walls form a barrier between one of the first and second openings and the third opening, respectively.

In an example of the present disclosure, the frame of the battery cell pack further includes first and second end frame walls extending perpendicular to the frame plate and placed on end sides of the bottom surface. Such end frame walls allow for isolation of first and second terminals of the battery cell from any coolant (e.g. gas or liquid) flowing between adjacent battery cell packs. This provides a reduction of the risk of short circuit between terminals of adjacent battery cell packs. The first and second end frame walls may extend along a thickness direction of the battery cell.

In an example of the present disclosure, the frame includes a plastic material. Examples of suitable plastic materials are polypropylene and polyethylene, and the like. Such plastic material can have good electrical and thermal insulation, allowing isolation electrically and thermally of any component bellow the frame from the terminals and gas vented. Furthermore, plastic material are relatively inexpensive and typically easy to manufacture, thus providing cost savings.

In an example of the present disclosure, the thermal protection plate includes mica material. Such mica material can have good electrical and thermal insulation, allowing isolation electrically and thermally of component bellow the thermal protection plate from gas vented. Use of mica material prevents heat damaging the bottom plate of the battery so that the gasses can be expelled from the battery in a controlled.

In an example of the present disclosure, the battery cell is a rectangular shape battery cell. This means that a cross section of the battery cell is substantially rectangular, i.e. not round. For example, the battery cell can be a prismatic battery cell or a pouch battery cell. Such shape allows the battery cells to be stacked with high packaging efficiency, thereby reducing the total volume required for the battery cells. Preferably, the battery cell is a prismatic cell.

In an example of the present disclosure, the battery cell pack can further include a bottom plate extending parallel to the bottom side of the battery cell and in contact with the first and second intermediate frame walls. Such bottom plate can support the battery cell pack. In this context, the intermediate frame walls not only form a channel for gas exiting the gas vent, but also render the battery cell pack mechanically robust and stable. In short, the intermediate frame walls have a structural function.

It is noted that in an alternative configuration, the bottom plate is not in contact with the first and second intermediate frame walls or with only one of the first and second intermediate frame walls. Of course, also in this configuration, a short circuit between cell terminals due to conductive vented gases through the cell vent has to be avoided. This may be the case if the first and second intermediate frame walls have a sufficient dimension.

In an example of the present disclosure, the thermal protection plate is in contact with the bottom plate. Such configuration of the thermal protection plate allows to maximize the volume of the channel, thereby allowing the maximum amount of gases to flow out of the battery pack.

In an example of the present disclosure, the bottom plate includes aluminium. The use of aluminium can allow high temperatures to evenly distribute along the bottom plate. Such even distribution allows the bottom plate to get cooler faster than when a hot sport occurs along the bottom plate.

In an example of the present disclosure, the battery cell pack further includes a cooling plate disposed above a top side of the battery cell opposite to the bottom side. Such cooling plate stabilizes battery cell temperature and provides optimal temperature uniformity. This allows reduction of the temperature of the battery cell pack, as well as creating a thermal barrier towards the vehicle cabin in case of cell thermal event, without the need of additional thermal protection barriers. As mentioned in the background, typical configurations require a thermal protection plate be placed below the cooling plate to protect the cooling plate (above a bottom side of the battery cell) from external thermal losses, thereby further increasing the battery height.

In an example of the present disclosure, the cooling plate includes aluminum. Aluminum material is a lightweight material, which further reduces the weight of the battery cell pack.

In an example of the present disclosure, the battery cell pack further include a thermal interface material (TIM) placed between the top side of the battery cell and the cooling plate. The TIM promotes heat flow, allows heat distribution along the cooling plate, and allows reduction of uneven temperature distribution between adjacent battery cells. As seen in FIG. 1, the current configuration results in a more compact battery cell pack.

In an example of the present disclosure, a battery pack includes a plurality of battery cell packs arranged in a stacked manner such that first and second terminals of the plurality of battery cell packs are aligned to form first and second terminal rows on a bottom side of the battery pack; and gas vents of the plurality of battery cell packs are aligned to form a vent row on the bottom side of the battery pack. Conventional batteries manufacturing process is from cell to module, and then from module to pack. This intermediate step divides the battery into separate modules. In this design terminal plates, side plates, and internal connectors of a module take up space and weight. The present disclosure provides a battery pack which reduces the height (in the z-axis) of the battery pack, as there are less plate layers in the pack as well as eliminating module structures hence reducing weight. In other words, the battery pack according to the present disclosure is not subdivided in modules or does not comprises modules. Rather, the battery pack is formed directly by arranging the plurality of battery cell packs in a stacked manner.

In the present context, the bottom side of the battery pack is a side of the battery pack which faces downwards if the battery pack is in an operational position, e.g. mounted in a vehicle.

In an example of the present disclosure, an electric vehicle includes a passenger cabin and a battery pack located under the passenger cabin. In other words, the battery pack is arranged vertically below the passenger cabin if the vehicle is in an operational position, i.e. in a position in which it is able to drive. The battery height directly affects vehicle height hence vehicle consumption. The configuration reduces the height of the battery cell pack, thereby increasing overall vehicle efficiency.

In an example, the first and second terminals of the plurality of battery cell packs of the battery pack are facing away from the passenger cabin. This means, that in an operational position of the vehicle, the first and second terminals are facing downwards. As has been mentioned before, this orientation allows to reduce the height of the battery pack, especially when being compared to known battery packs.

These features and structures may be included in various combinations that include some of these features and structures, all of these features and structures, or one of these features and structures.

BRIEF DESCRIPTION OF THE DRAWINGS

The present disclosure will be described in more detail below, with reference to preferred embodiments as shown in the drawings attached, in which:

FIG. 4 shows a vehicle comprising a battery pack.

DESCRIPTION OF EMBODIMENTS

The aspects of the present disclosure will now be described more fully hereinafter with reference to the accompanying drawings, in which certain embodiments of the disclosure are shown.

Figure 1:
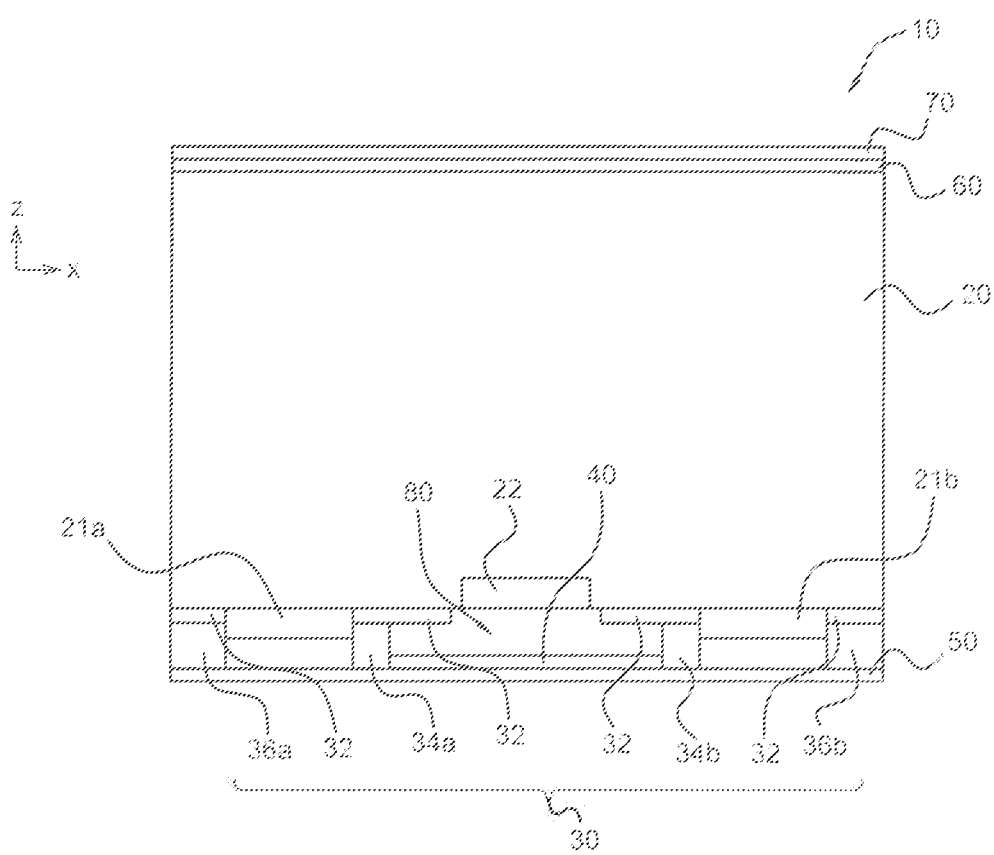
FIG. 1 shows a schematic view of a battery cell pack.
Figure 2:
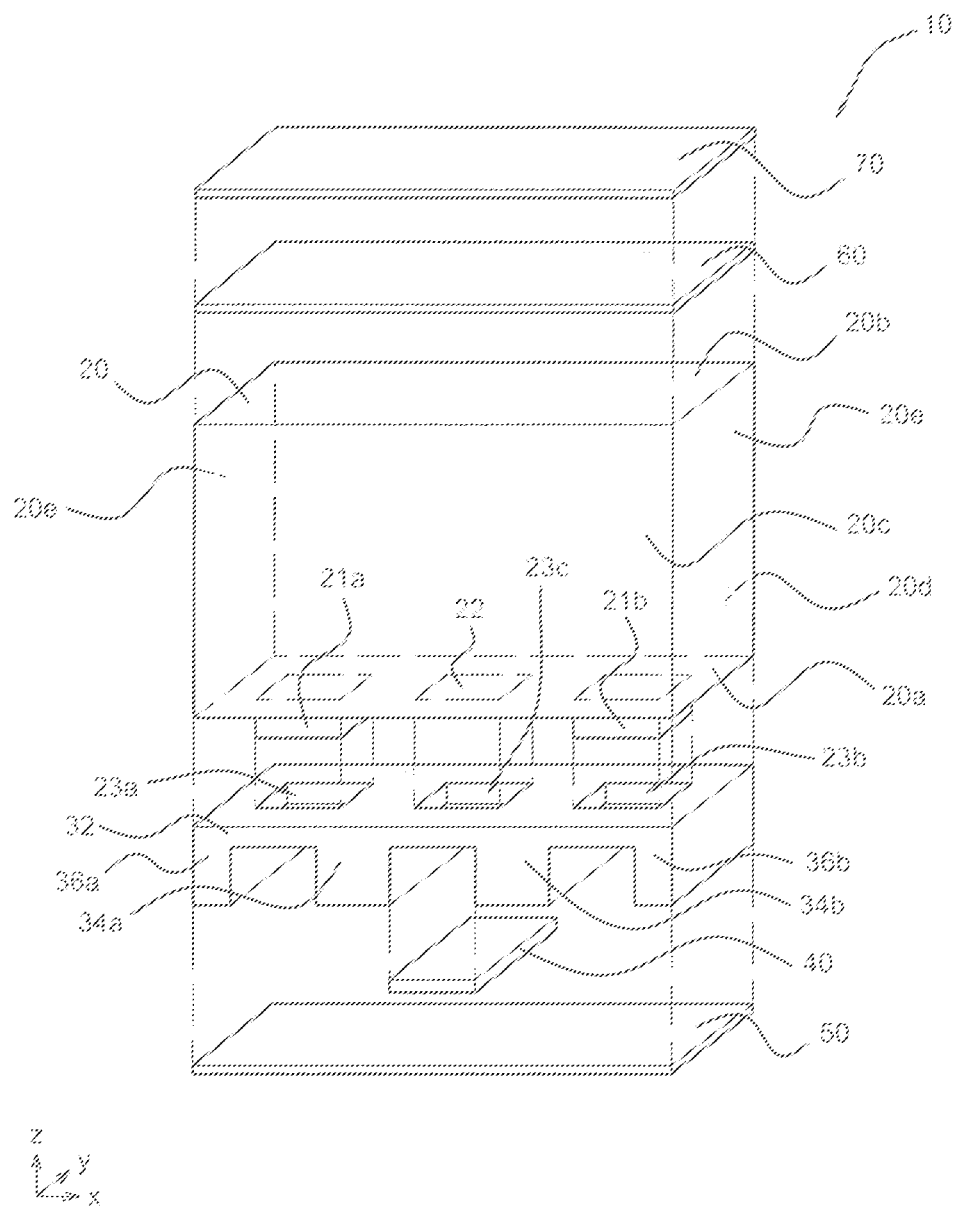
FIG. 2 shows another schematic view of a battery cell pack.

FIG. 1 and FIG. 2 illustrate a schematic view of a battery cell pack 10. The battery cell pack 10 can also be called battery cell block. Directions X, Y and Z are shown in each figure to assist in the explanation of the relative arrangement of features of the battery cell pack 10. The battery cell pack 10 includes a battery cell 20 (e.g., lithium ion electrochemical cells), a frame 30 and a thermal protection plate 40. The battery cell 20 includes a first terminal 21a, a second terminal 21b and a gas vent 22 on a bottom side of the battery cell 20. The bottom side of the battery cell 20 is opposite a top side of the battery cell. The first terminal 21a and the second terminal 21b correspond to a positive electrode terminal and a negative electrode terminal, respectively, of the battery cell or vice versa. Terminals 21a, 21b are configured both to conduct electricity, and are made from a conductive material such as a meta (e.g., aluminium, copper, nickel-plated steel, or other suitable alloys).

As shown in FIGS. 1 and 2, the battery cell 20 has a rectangular shape, including a top side 20b, a bottom side 20a, two lateral sides 20e, a font side 20c and a back side 20d. The top and bottom sides 20a, 20b are substantially parallel between them. The two lateral sides 20e are substantially parallel between them. The front and back sides 20c, 20d are substantially parallel between them. Each pair of substantially parallel sides is perpendicular to the other pairs. The shape of the battery cell 20 in FIG. 1-2 is made for illustration only, and therefore can have more lateral sides than shown in drawings.

The cell vent 22 allows gases formed inside the battery cell to flow out of the battery cell 20. The gas vent hole 22 is arranged between the first terminal 21a and the second terminal 21b of the bottom surface of the battery cell 20. The battery cell is used as energy source. When in use, the battery cell produces heat, thereby generating gases inside the battery cell, increasing the internal pressure. In order to prevent an excessive internal pressure, the gas vent functions as a valve that opens when the pressure exceeds a given pressure, thereby allowing the gases to be vented out of the battery cell 20.

The frame 30 of the battery cell pack 10 is on the bottom side 20a of the battery cell 20. The frame 30 supports the battery cell, which is placed on top of the frame. The frame 30 includes a frame plate 32 including first and second openings 23a, 23b aligned with the first and second terminals 21a, 21b; a third opening 23c aligned with the gas vent 22; and first and second intermediate frame walls 34a, 34b extending perpendicular to the frame plate 32. Optionally, the first and second intermediate frame walls 34a, 34b can be integrally formed with the frame plate 32. Alternatively, the first and second intermediate frame walls 34a, 34b can be separately formed and then connected to the frame plate 32, by, for example, adhesive, welding or any other suitable manner. Optionally the first, second and third openings can have a rectangular shape. Alternatively, the first, second and third openings can have any other shape, such as circular, square or any other polygon.

The intermediate frame walls 34a, 34b and the thermal protection plate 40 form a channel 80 along a length of the bottom side of the battery cell 20 between the terminals 21a, 21b. The channel 80 allows the gases vented out through the gas vent 22 to flow out of the battery cell pack 10.

In an embodiment, the first and second intermediate frame walls 34a, 34b are placed between each opening 23a, 23b, 23c of the terminals 21a, 21b and the cell vent 22, respectively. Optionally, the first and second intermediate frame walls 34a, 34b can have a dimension in the X-axis such that a space is present between each intermediate frame wall 34a, 34b and any of the first, second and third openings 23a, 23b, 23c aligned with the terminals 21a, 21b and the gas vent 22. Such space maximizes a volume of the channel 80 (particularly in the in the x-axis), thereby allowing more room for gas to flow out of the battery cell pack 10.

Optionally, the frame 30 can further include first and second end frame walls 36a, 36b extending perpendicular to the frame plate 32 and placed on end sides of the bottom surface. The first and second end frame walls 36a, 36b can be integrally formed with the frame plate 32. Alternatively, the first and second end frame walls 36a, 36b can be separately formed and then connected to the frame plate 32, by for example, adhesive or welding. The first and second intermediate frame walls 34a, 34b and the first and second end frame walls 36a, 36b can have a dimension in the X-axis such that another space is present between each end frame wall 34a, 34b and any of the first and second openings 23a, 23b aligned with the terminals 21a, 21b. Such space in the x-axis allows heat to be removed from the terminals (which are heated when the battery is in use), and hence, from within the battery cell, when a fluid (e.g., gas or dielectric liquid) is passed across the terminals that is at a lower temperature than the temperature of the terminals.

According to an exemplary embodiment shown in FIGS. 1 and 2, the frame 30 includes a plastic material. That is the whole frame 30 or one or more of its components (the frame plate 32, the first and second intermediate frame walls 34a, 34b and the first and second end frame walls 36a, 36b) include a plastic material. Suitable plastic material include, but are not limited to, polyamide ("PA"), polyethylene ("PE"), polyvinyl chloride ("PVC"), polypropylene ("PP"), polycarbonate ("PC"), polyoxymethylene ("POM" or acetal), and combinations thereof, and can help to ensure good thermal and electrical insulation for the frame. Preferably, the plastic material is at least one of PA, PVC and PP.

As shown in FIGS. 1 and 2, the battery cell pack 10 includes a thermal protection plate 40. The thickness of the thermal protection plate 40 will vary depending on the battery cell capacity and its potential for heat production. Optionally, the thermal protection plate 40 includes mica material. Such mica material can be easily cut and shaped to a desired thickness.

As shown in the exemplary embodiment of FIGS. 1 and 2, the battery cell 20 is a rectangular shape battery cell. The battery cell 20 has a thickness (measured in the Y-axis), a length (measured in the X-axis) and a height (measured in the Z-axis). Examples of rectangular shape battery cells are prismatic battery cells. Such a rectangular shape allows a larger number of battery cells to be stacked, using a minimum amount of space than other shapes (e.g. cylindrical cells). Preferably, the battery cell 20 is a prismatic cell.

The battery cell pack 10 includes a bottom plate 50 extending parallel to the bottom side 20a of the battery cell 20 and in contact with the first and second intermediate frame walls 34a, 34b. Optionally, the bottom plate 50 is further in contact with the first and second end frame walls 36a, 36b. The bottom plate 50 can be connected to the intermediate frame walls 34a, 34b and/or the end walls 36a, 37b by gluing, fastening, welding or any other suitable means. Such bottom plate serves as a bottom cover of the battery frame, thereby sealing the battery cell(s) from the outside.

According to an embodiment, the thermal protection plate 40 is in contact with the bottom plate 50. Optionally, the thermal protection plate 40 can be glued to the bottom plate 50 or can be welded to the bottom plate 50. The first and second intermediate walls 34a, 34b, the thermal protection plate 40 and the bottom side 20a of the battery cell 20 form the channel 80, through which gases can be flowed out of the battery cell pack.

According to the embodiment shown, the battery cell pack 10 includes a cooling plate 50 disposed above a top side 20b of the battery cell 20 opposite to the bottom side 21a. The cooling plate dissipates heat generated from the battery cell. Cooling plate 50 can include metal. Suitable metals include, but are not limited to aluminium, steel, stainless steel, and combinations thereof.

According to an embodiment, the battery cell pack 10 include a thermal interface material (TIM) 60 placed between the top side 20b of the battery cell and the cooling plate 70. When the battery cell pack 10 is in use, the top surface 20b of the battery pack is heated. The TIM material provides then a rapid heat transfer from the top surface 20b the battery cell 20 to the cooling plate, distributing then heat along the TIM plate. Optionally, the TIM can be in the form of one or more films. Optionally, the TIM is in the form of adhesive between the top side 20b of the battery cell and the cooling plate 70. The thickness of the TIM plate can vary. The TIM plate is preferably sufficiently thin to reduce thermal resistance.

According to an embodiment, the battery cell pack has a battery height of about 135 mm. Height is given with respect to the Z-axis shown in figures. Known battery cell packs have a height of about 145 mm. Thus, the configuration shown provides a more efficient arrangement for reducing the battery height. As shown in FIGS. 1 and 2, a height of the cooling plate 70 is about 5 mm, a height of the TIM 60 is about 2 mm, a height of the battery cell is about 100 mm, a height of the frame 30 is about 25 mm, a height of the thermal protection plate 40 is about 1 mm, and a height of the bottom plate 50 is about 3 mm.

As discussed in the background, by arranging the battery cell pack as shown, with the cell venting downwards instead of upwards toward the cabin), additional materials and safety space is not needed for the protection of passengers in the case of a thermal event. Past configurations required a thermal protection plate between the battery cell 20 and the vehicle's cabin floor to protect passengers. By venting the battery below, the current battery provides the safety protection required in a more but in a more packaging efficient way (or compact form).

Figure 3:
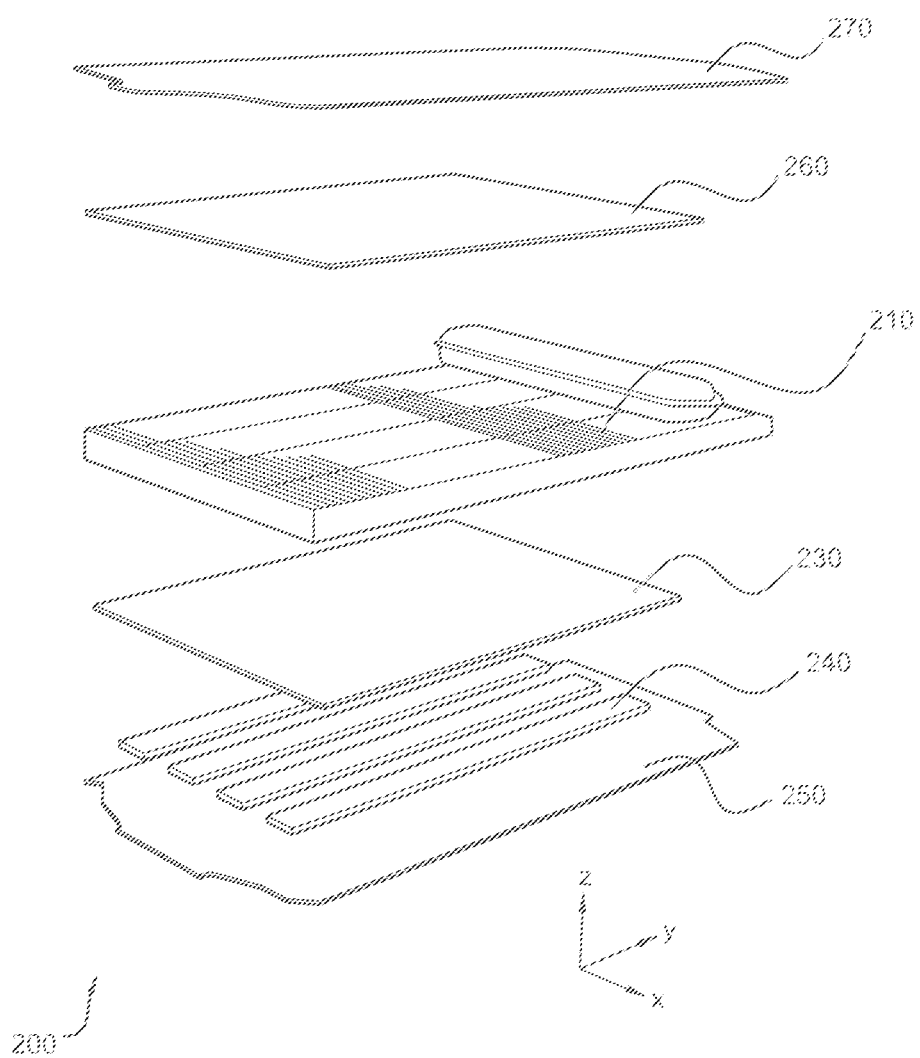
FIG. 3 shows a schematic view of a battery pack.

FIG. 3 shows a schematic view of a battery pack 200. The battery pack 200 includes a plurality of battery cell packs 210 arranged in a stacked manner such that first terminals of the plurality of battery cell packs 210 are aligned to form a first terminal row on a bottom side of the battery pack 200. Second terminals of the plurality of battery cell packs 210 are aligned to form a second terminal row on the bottom side; and gas vents of the plurality of battery cell packs 210 are aligned to form a vent row on the bottom side. Each battery cell pack of the plurality of battery cell packs 210 can correspond to the battery cell pack 10 of FIG. 1 and FIG. 2.

Such a battery pack 200 according to any one of the example embodiments and/or the features as described above can be provided for an electric vehicle (cf. FIG. 4). In addition, the electric vehicle can include a passenger cabin 300. Further, the battery pack 200 can be disposed under the passenger cabin. The electric vehicle can be an electrical, hybrid, or plug-in hybrid vehicle. Thus, the electric vehicle can be a fully electric vehicle or hybrid vehicle. The electric vehicle includes typically at least one electric machine, but may include additional electrical machines. The electrical machine(s) are configured to provide propulsion for the electric vehicle. Generally, the term "electric propulsion system", as used herein, typically refers to vehicle electrical components for providing energy (such as traction energy) and for storing energy (delivering and receiving energy). In other words, an electric propulsion system refers to a system configured to provide propulsion to an electric vehicle by converting electrical energy to mechanical energy, the electrical energy provided by means of the energy storage system, such as the battery pack 200. Besides the electrical components as mentioned above, an electric propulsion system may include additional components such as cable(s), sensor(s), control units, battery management unit(s) etc. The electric propulsion system is configured to deliver and receive energy for providing propulsion to the vehicle, but also for performing various vehicle operations of the vehicle.

FIG. 4 shows an electric vehicle comprising a passenger cabin 300 and a battery pack 200 being arranged under the passenger cabin 300. For the ease of representation, only some of the battery cell packs 10, 210 of the battery pack 200 and only some portions of the frame 30 are shown in FIG. 4 in order to clearly show the first and second terminals 21a, 21b of the respective battery cells 20. The remaining components of the battery pack 200 and the battery cell packs 10, 210 are not shown in FIG. 4.

As can be seen from FIG. 4, the first and second terminals 21a, 21b are facing away from the passenger cabin 300. In other words, the first and second terminals 21a, 21b are oriented downwards.

Alternatively, the present disclosure can be used for applications other than vehicles and passenger cars that use rechargeable battery packs as the battery pack 200. For example, the battery pack 200 of the present disclosure can be used in commercial vehicles or utility vehicles such as trucks and backup power source storages.

These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

The invention claimed is:

1. A battery cell pack, comprising:
a battery cell comprising first and second terminals and a gas vent on a bottom side of the battery cell, wherein the bottom side faces downwards in a mounting position of the battery cell pack;
a frame on the bottom side of the battery cell, the frame comprising:
a frame plate comprising first and second openings aligned with the first and second terminals and a third opening aligned with the gas vent; and
first and second intermediate frame walls extending perpendicular to the frame plate; and
a thermal protection plate placed conformally between the intermediate frame walls;
wherein the intermediate frame walls contact the thermal protection plate to form a channel along a length of the bottom side of the battery cell between the terminals.

2. The battery cell pack of claim 1, wherein each of the two intermediate frame walls is placed between one of the first and second openings for the terminals and the third opening for the gas vent.

3. The battery cell pack of claim 1, wherein the frame further comprises first and second end frame walls extending perpendicular to the frame plate and placed on end sides of the bottom side.

4. The battery cell pack of claim 1, wherein the frame is made of plastic material.

5. The battery cell pack of claim 1, wherein the thermal protection plate comprises mica material.

6. The battery cell pack of claim 1, wherein the battery cell is a rectangular shape battery cell.

7. The battery cell pack of claim 1, wherein the battery cell is a prismatic battery cell.

8. The battery cell pack of claim 1, further comprising a bottom plate extending parallel to the bottom side of the battery cell and in contact with the first and second intermediate frame walls directly adjacent to the thermal protection plate.

9. The battery cell pack of claim 8, wherein the thermal protection plate is in contact with the bottom plate between the first and second intermediate frame walls.

10. The battery cell pack of claim 8, wherein the bottom plate comprises aluminum.

11. The battery cell pack of claim 1, further comprising a cooling plate disposed above a top side of the battery cell opposite to the bottom side.

12. The battery cell pack of claim 11, wherein the cooling plate comprises aluminum.

13. The battery cell pack of claim 8, further comprising a thermal interface material between the top side of the battery cell and the cooling plate.

14. A battery pack comprising a plurality of battery cell packs according to claim 1, and arranged in a stacked manner such that:

first and second terminals of the plurality of battery cell packs are aligned to form first and second terminal rows on a bottom side of the battery pack; and gas vents of the plurality of battery cell packs are aligned to form a vent row on the bottom side of the battery pack.

15. An electric vehicle comprising a passenger cabin and the battery pack according to claim 14, located under a passenger cabin.

16. The electric vehicle of claim 15, wherein the first and second terminals of the plurality of battery cell packs of the battery pack are facing away from the passenger cabin.

17. A method of forming a battery cell pack, the method comprising:
providing a battery cell comprising first and second terminals and a gas vent on a bottom side of the battery cell, wherein the bottom side faces downwards in a mounting position of the battery cell pack;
arranging a frame on the bottom side of the battery cell, the frame comprising a frame plate comprising first and second openings aligned with the first and second terminals and a third opening aligned with the gas vent, and first and second intermediate frame walls extending perpendicular to the frame plate; and
placing a thermal protection plate conformally between the intermediate frame walls such that the intermediate frame walls contact the thermal protection plate to form a channel along a length of the bottom side of the battery cell between the terminals.

18. The method of claim 17, further comprising arranging a cooling plate disposed above a top side of the battery cell opposite to the bottom side.

19. The method of claim 17, further comprising arranging a thermal interface material between the top side of the battery cell and the cooling plate.

20. The method of claim 17, wherein the two intermediate frame walls are placed between each opening of the terminals and the gas vent, respectively.

* * * * *